United States Patent [19]
Sas-Jaworsky et al.

[11] Patent Number: 5,234,058
[45] Date of Patent: * Aug. 10, 1993

[54] COMPOSITE ROD-STIFFENED SPOOLABLE CABLE WITH CONDUCTORS

[75] Inventors: Alex Sas-Jaworsky, Houston, Tex.; Jerry G. Williams, Ponca City, Okla.

[73] Assignee: Conoco Inc., Ponca City, Okla.

[ * ] Notice: The portion of the term of this patent subsequent to Jan. 14, 2009 has been disclaimed.

[21] Appl. No.: 803,945

[22] Filed: Dec. 9, 1991

Related U.S. Application Data

[63] Continuation-in-part of Ser. No. 495,055, Mar. 15, 1990.

[51] Int. Cl.⁵ .................. E21B 17/00; E21B 19/00
[52] U.S. Cl. .................................. 166/385; 166/65.1
[58] Field of Search ............ 116/384, 385, 65.1, 116/72, 242; 138/123, DIG. 7

[56] References Cited

U.S. PATENT DOCUMENTS

| | | | |
|---|---|---|---|
| 4,024,913 | 5/1977 | Grable | 166/72 |
| 4,416,329 | 11/1983 | Tanner et al. | 166/68 |
| 4,452,314 | 6/1984 | Zion | 166/328 |
| 4,592,421 | 6/1986 | Hoffman et al. | 166/66 |
| 4,681,169 | 7/1987 | Brookbank, III | 166/385 |

*Primary Examiner*—William P. Neuder
*Attorney, Agent, or Firm*—John E. Holder

[57] ABSTRACT

Well tools are run into a well, usually a deviated well, using a composite wireline cable made up of a bundle of parallel slidable composite rods and electrical or optical conductors covered with a flexible protective sheath. The cable is stored on a spool and from there it is run into and retrieved from the well.

9 Claims, 2 Drawing Sheets

COMPOSITE ROD-STIFFENED SPOOLABLE CABLE WITH CONDUCTORS

DESCRIPTION

This application is a continuation-in-part of U.S. patent application Ser. No. 07/495,055 filed Mar. 15, 1990 now U.S. Pat. No. 5,080,175 entitled "Use of Composite Rod Stiffened Wireline Cable For Transporting Well Tool".

BACKGROUND OF THE INVENTION

It has become relatively common within the last few years to drill wells in the search for oil and gas and the like with a portion of the wellbore deviating from the usual vertical orientation. The deviation may extend for a considerable distance at a substantial angle from the horizontal and then return to the usual vertical orientation. In drilling such wells, a device known as a whip stock is set at spaced intervals along the wellbore as the drilling progresses to cause the wellbore to deviate from the vertical until the desired, relatively horizontal deviation angle is attained. The wellbore is then drilled for as much as several thousand feet along the deviation angle and may be subsequently varied to another deviation angle or returned to the vertical orientation by setting the whip stock at spaced intervals as previously mentioned.

As is well known in the art of drilling wells, there are many well tools including such tools as well logging tools that are generally run into the wellbore on a wireline and/or cable to perform various operations therein. Such tools depend upon the force of gravity to permit positioning of the well tools at the desired formation in the wellbore.

Logging for vertical wells is performed using steel wireline cables to transport the logging tools. The weight of the tool forces the tool and line down to the bottom of the hole. In deep horizontal wells and in highly deviated wells, the force vector component pushing the tool down the hole is insufficient to overcome frictional forces of the tool and line rubbing on the walls of the hole and alternate methods must be used. One of the current methods for logging deviated and horizontal wells is to use the drill pipe to transport the logging tool. This method however is time consuming and costly. In addition, the high mass of magnetic material in the drill string can interfere with some logging instruments.

In recent years, coiled steel tubing has been used to log horizontal holes and deviated wells. Steel tubing is limited to diameters on the order of 1.5 inches and wall thicknesses to around 0.1 inches in order to permit spooling. This small size limits the available bending stiffness to resist buckling and tensile strength required to pull the tubing out of the hole. The tensile strength limitation establishes a critical depth for the steel tubing beyond which it cannot be used since the weight of the tubing and fractional forces exceeds its own strength. The strength factor limitation prevents coiled tubing from logging many extended reach wells.

It has become essential to provide some means of forcing wireline actuated tools through horizontal wells and highly deviated wells particularly when such wells are of substantial depth.

THE PRIOR ART

U.S. Pat. No. 4,024,913 to Grable teaches the use of a parallel lay cable in which strands of Kevlar ® are individually encased in a polymer (such as epoxy or nylon) and surrounded by a protective sleeve. The cable is capable of withstanding both limited compressive and tensile forces, can be spooled, and in the specific application described, is useful as a sucker rod.

U.S. Pat. No. 4,416,329 to Tanner et al. discloses a flat ribbon for use as a sucker rod comprised of graphite fibers in a thermoset resin and encased in a textile jacket. The ribbon can be spooled and can withstand both compressive and tensile loads.

U.S. Pat. No. 4,452,314 to Zion teaches the use of a fibrous material (glass) reinforcing a thermosetting resin forming a cylindrical tube which is used as a sucker rod.

U.S. Pat. No. 4,592,421 to Hoffman et al. discloses the use of uni-directional reinforced composite fiber rods as sucker rods.

THE INVENTION

In accordance with this invention, a composite electrical wireline cable is comprised of a plurality of high stiffness parallel slidable composite unidirectional rods and electrical or optical conductors bundled with the rods in an assembly. The assembly is covered by an outer flexible protective sheath. This cable assembly is used to transport well tools into a well, and particularly is used to force well tools through horizontal wells and highly deviated wells.

DETAILED DESCRIPTION OF THE INVENTION

Figure 1A:
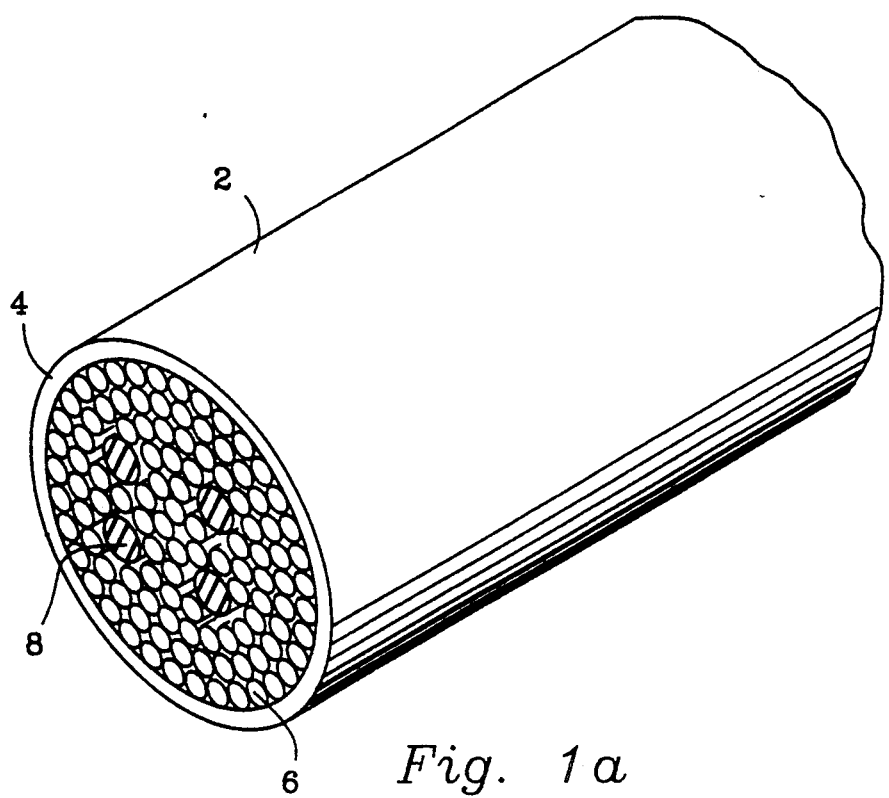
FIG. 1a is a cross-sectional view of a cable containing parallel composite rods and internal electrical or optical conductors.

The invention is best described by reference to the drawings. FIG. 1 shows a section of composite wireline cable 2. The cable is made up of a flexible protective sheath 4 and a bundle of parallel high stiffness composite rods 6 contained within the protective sheath.

A plurality of insulated conductive wires or fiber optic conductors 8 are laid within the core to serve as energy conductors in the logging cable. These wires or conductors may be arranged parallel to the rods 6 or laid in a long spiral wrap so as to be interweaved within the rods 6 and may also be twisted to provide for stretch and spooling of the cable.

The composite rods used in the wireline cable may be made from a number of different materials. Preferred are uni-directional graphite fibers pultruded using a plastic binder such as vinyl ester, epoxy, or a thermoplastic or thermosetting resin. Composite rods formed in this manner have a high uniaxial stiffness. Such composite rods have been made for other applications and are commercially available. Composite fiber rods may also be made from such materials as glass fibers, ceramic fibers, polymer fibers, for example from Kevlar ® polymer which is a product of the Du Pont company and from Exten ® polymer which is a product of the Goodyear Corporation. The plastic binders mentioned, among others, may be used in the preparation of composite rods from these materials.

The composite rods are designed in diameter to meet a number of design constraints. Based on the number of rods used in the cable, a sufficient diameter must be used to provide the required thrust to force the well tool into the horizontal or deviated hole. The rods must also be designed to buckle in a controlled manner without failure. Also, the rods must be sized to permit the composite wireline cable to be spooled onto a reasonable size spool. The primary design load for the composite cable is compression. In service, the cable will buckle in a controlled manner without exceeding material strength and strain allowables. The elastic energy stored in the buckled configuration provides a thrust vector which is applied to the well tool.

Individual composite rods are usually sized to a diameter of between about 0.1 and about 0.5 inches. The number of rods used in a composite cable will depend on the size of the cable and is usually between about 7 and about 137 rods. The cable itself usually has a diameter of between about 1.0 and about 4.0 inches.

The sheath which forms the outer surface of the composite cable may be formed of any suitable material. The sheath must have sufficient strength to hold the composite rods together as a bundle when the cable is forced into the well. In service, the composite cable will buckle and at the points of buckling will impose a normal force on the walls of the casing or open hole. This force will create friction as the cable is moved down the hole. One of the purposes of the protective sheath 4 around the composite rods 6 and conductors 8 is to resist wear and friction. For this reason, it is desirable to use an outer sheath which has a low coefficient of friction and is wear resistant. Materials such as Rilsan® which is sold by ATO Chem, Teflon®, Kevlar®, Nylon, and Hytrel®, sold by Du Pont, or Kevlar® frit may be used for this purpose.

The composite cable used in carrying out the process of the invention has been considered in the past for service as a composite tether. Composite tethers are designed primarily to carry tension loads. The primary design load for composite cables used in the movement of well tools into a well is compression. As stated previously the composite wireline cable in service will buckle in a controlled manner without exceeding material strength and strain allowables. The elastic energy stored in the buckled configuration provides a thrust vector which is applied to the well tool. The composite cable will also exhibit high strength for pulling the tool out of the hole.

The high stiffness rods used in the cables are free to move in relationship to each other, which provides the bending flexibility to permit a relatively small radius of curvature to be assumed for spooling. In the preparation of the composite cable, the individual rods in the cable are periodically given a small twist to facilitate spooling.

Figure 1B:
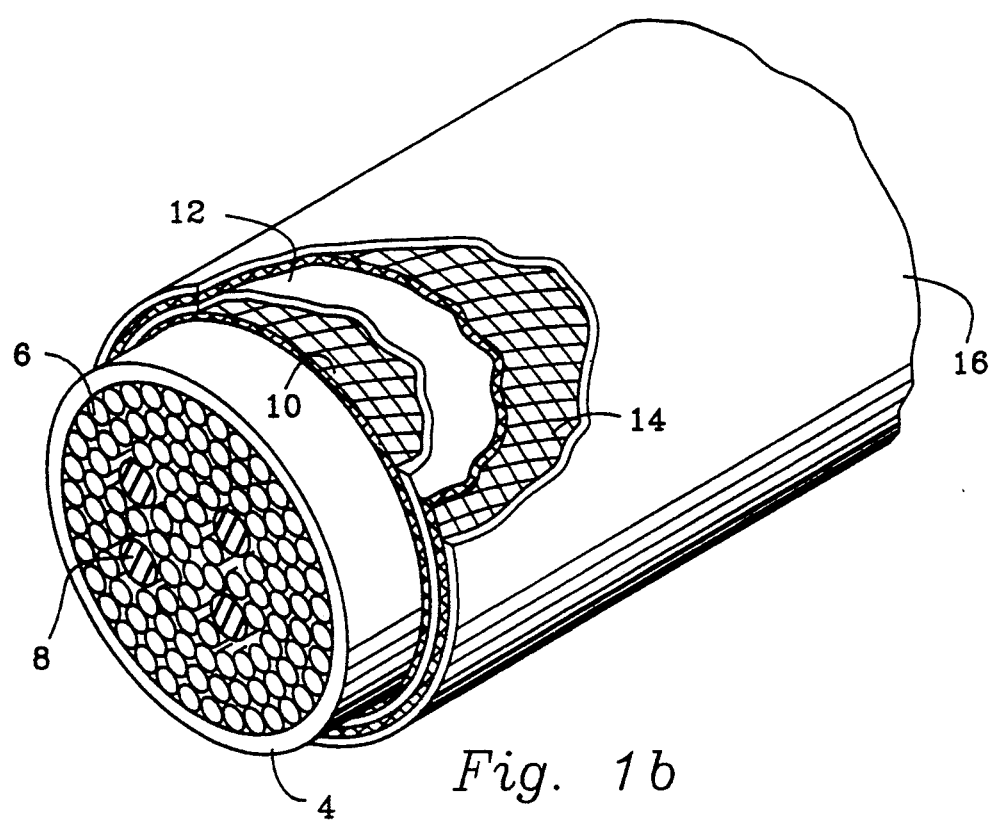
FIG. 1b is a cross-sectional view of a cable containing parallel composite rods, conductive cables and conductive layers of woven wire.

FIG. 1b shows an alternative cable arrangement for a composite logging cable wherein the bundle of rods 6 is first covered by a sheathing 4 as described above. Next, a conductive path is provided such as by a wire braid 10, laid or weaved, over the sheath. The wire braid layers 10 and 14 are comprised of multiple strands of thin copper wire woven or lain in a criss-cross pattern similar to that used in co-axial cable. An insulative sheath 12 is then formed about the conductive layer 10 to protect the layer and insulate it from another outer conductive layer 14 to provide at least one pair of conductive paths in the cable. An outer sheath 16 is formed about the outer most conductive layer 14 to provide a wear protective surface for the cable assembly. This sheath may be constructed in a manner similar to the outer sheath of the cable shown in FIG. 1a. It is also seen in FIG. 1b that a combination of wire conductors or fiber optic cables 8 such as shown in the FIG. 1a embodiment and the conductive layers of wire 10 and 14 as described above, can be utilized to provide multiple conductive paths within the cable.

Figure 2:
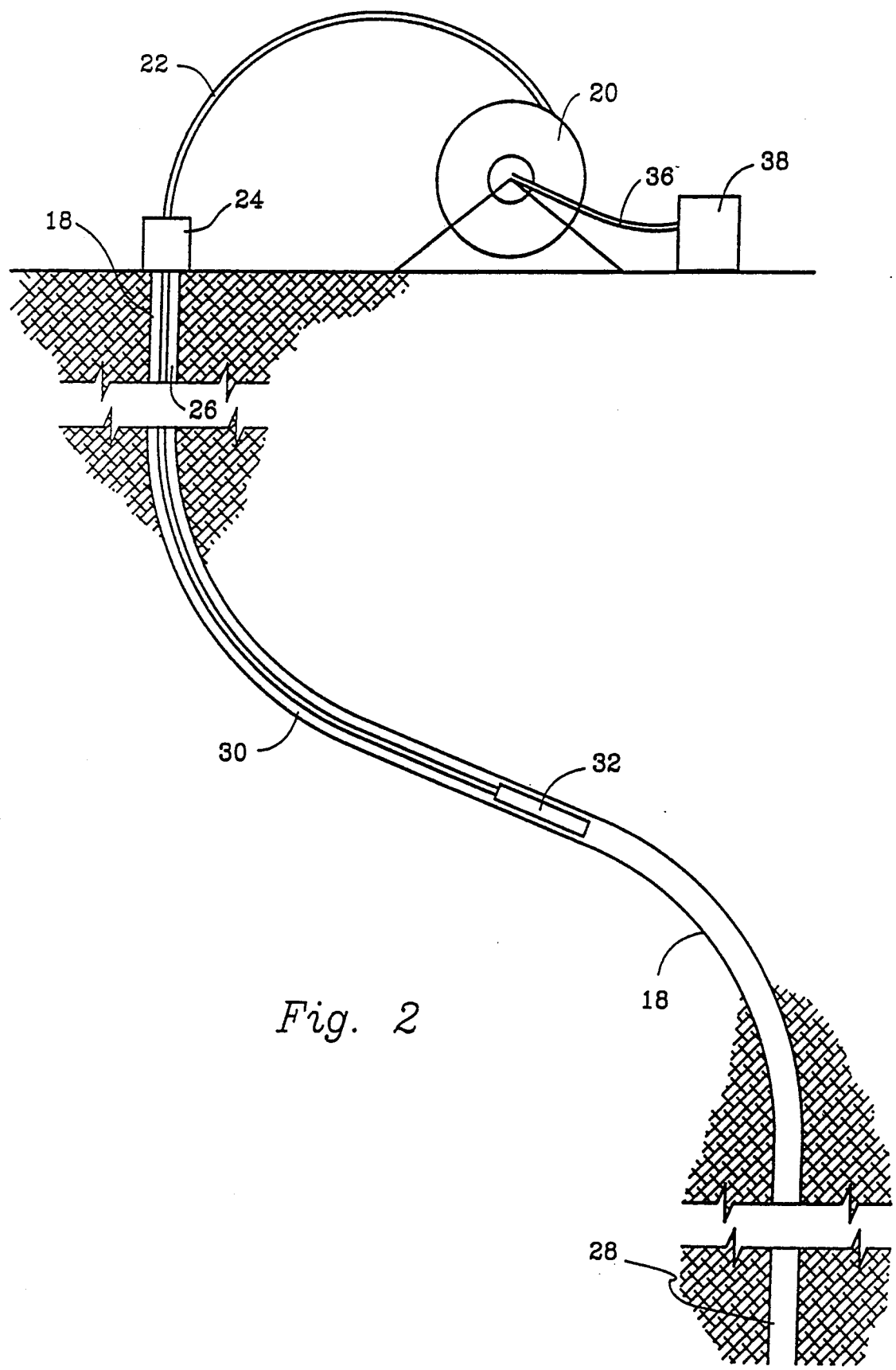
FIG. 2 is a schematic drawing illustrating the use of the composite rod conductor cable in a deviated well.

Referring now to FIG. 2, a wellbore generally designated by the reference character 18 is shown. The wellbore has a vertical upper portion 26 extending to the surface, a vertical lower portion 28 and a deviated portion 30 connecting the upper and lower portions 26 and 28. The vertical portion 26 and the deviated portion 30 are normally several thousand feet in length while vertical portion 28 is usually much shorter. The wellbore may also terminate in a near horizontal section.

Arranged in operable relationship to the wellbore 18 and located on the surface is an injector assembly designated by the reference character 24. A reel 20 is also provided on the surface and the composite wireline electrical cable 22 is stored on this reel. Roller belts are frequently used as a guide in injector 24 and also to drive the composite cable down the hole. Contacts not shown are provided on the reel 20 to provide an electrical or optical connection between the conductors in the cable 22 and a stationary surface cable 36 which connects the downhole cable conductors 8 with a control system 38 at the surface.

Spool 20 and injector 24 are not detailed since these types of apparatus are well known in the art. For example, specific spool and injector arrangements are shown in U.S. Pat. Nos. 3,401,794; 3,722,594; and 4,682,657, among others.

OPERATION

After the apparatus shown in FIG. 2 has been assembled, the composite electrical wireline cable 22 is extended through injector 24. The desired well tool such as a logging tool 32 is then attached to cable 22. Electrical or optical connections are made between conductors in the cable 22 and the tool 32. The tool and cable are then placed in the upper portion 26 of well 18 and are lowered into the well by gravity. When well tool 32 reaches the deviated portion 18 of the well, the frictional engagement of the tool with the wall of this deviated portion is sufficiently great to overcome the force of gravity. When this occurs, injector 24 is used to apply downward force to the composite cable such that the logging tool 32 is forced into and along the deviated section 18. In the event that continuous application of force by injector 24 is not sufficient for this purpose, the injector may be operated to provide alternate upward and downward movement of the cable and logging tool 32 in order to assure continued downward progress. Actuation of the logging tool at desired intervals is carried out by the control device 38 at the surface by way of the energy conductors within the composite cable and electrically connected to the logging tool 32.

When logging tool 32 leaves the deviated portion of the well and enters vertical portion 28 further hindrance to movement of the tool may occur. In this event, the procedure described may be repeated to provide further downward movement of the logging tool.

If a different type of well tool is being used other than logging tool 32, for example, a perforating tool, the apparatus is connected and moved to the proper zone or formation in wellbore 18 in the manner previously described. After reaching the desired zone, the appropriate switch or switches in the control device 38 may be operated to fire the perforating tool through electrical circuits provided by conductors 8 (FIG. 1a) or 10 and 14 (FIG. 1b) contained within the composite cable.

Since the rods in the composite cable are not joined one to the other, the bending stiffness of the cable is approximately equal to the sum of the bending stiffness of the individual rods. The composite cable will buckle into a helical sine wave buckle pattern. The number of half waves will change depending upon the load. The curvature limit of an individual rod is determined by the allowable strain in the rod imposed by bending and axial compression.

In forming composite structures, several known techniques may be used such as pultrusion, filament winding, and molding. In pultrusion, filaments or fibers are drawn through a resin impregnating apparatus, then through dies to provide the desired shapes. Heat forming and curing means are provided in conjunction with the dies. Finally, the desired product which is produced continuously may be wound on a reel or spool. As an example, pultrusion is used in U.S. Pat. No. 4,416,329 to prepare a ribbon structure containing bundles of graphite fibers saturated with thermoplastic resin. The faces of the ribbon are covered with piles of woven material, such as glass fabric. Corner tows on the ribbon are made of Kevlar ® or glass. U.S. Pat. No. 4,452,314 uses pultrusion to form arcuate sections comprised of glass filaments or other reinforcing material disposed in a thermosetting resin. The arcuate sections are combined to form a sucker rod.

While any of the known fabrication techniques may be used, pultrusion is the preferred procedure for preparing the composite cable used in the process of the invention. This procedure is particularly applicable since it enables the cable to be product as a continuous product to whatever length is desired.

In addition to the advantages of the use of the composite cable in the process of the invention which have already been disclosed, there are a number of other pulses to using this type of cable. For example, the speed with which logging can be carried out using the continuous composite cable offers the opportunity to conduct logging operations more frequently thereby obtaining greater frequency of data to better evaluate the formation production potential. Since the composite cable is very stiff in the axial direction, the stretch of the line in tension will be minimal compared to the stretch of typical steel wirelines currently used in logging operations. This increased axial stiffness in tension will provide increased accuracy in determining the precise location for which logging data is obtained. The high axial strength of the composite cable permits high tension loads to be applied to the logging tool in the event that is becomes stuck in the hole, as previously described. The strength of the composite cable can be several time the failure load of commonly used wirelines. Wireline operations are typically designed to fail at the connection to a logging tool to more easily facilitate fishing operations to remove the tool. The higher strength of the composite cable will in many cases eliminate the need for fishing because the tool will simply become unstuck using its high strength capability. The low density of the composite materials used in the composite cable is close to the density of drilling mud. This aspect will reduce the frictional loads associated with gravity. The non-magnetic property of the composite cable permits some logging operations to be performed more accurately and precisely. Still another advantage, the logging operation can be conducted in a continuous operation as opposed to the discontinuous operation associated with using the drill pipe for conveyance of the logging tool.

It is pointed out that while the various embodiments of energy conductors disclosed herein may be described as electrical or optical to simplify the disclosure, it is intended that terms such as conductor, energy conductor or conductor means encompass any sort of energy conductor or cable for powering devices or for communicating signals. Therefore, while certain embodiments and details have been shown for the purpose of illustrating the present invention. It will be apparent skilled in the art that various changes and modifications may be made herein without departing from the spirit or scope of the invention.

We claim:

1. A high strength composite spoolable cable for running a well tool in and out of a wellbore and particularly running tools in highly deviated wellbores, the cable comprising:
    a plurality of parallel elongate composite rods arranged to slide relative to each other in a bundle;
    an outer flexible protective sheath for covering said plurality of rods and holding said rods together in said bundle; and
    energy conductor means arranged within said outer protective sheath.

2. The composite cable of claim 1 wherein said energy conductor means is comprised of electrical or optical conductors.

3. The composite cable according to claim 1 or 2 wherein the rods have a diameter of between about 0.1 and 0.5 inches.

4. The composite cable of claim 1 wherein said energy conductor means includes at least one electrical conductive path formed by a layer of thin wire lain in a criss-cross pattern about the rods arranged in a bundle.

5. The composite cable according to claim 1 or 2 wherein said energy conductor means includes at least one electrical conductive path formed by an insulated wire member which is imbedded within the rods arranged in a bundle.

6. A high strength composite spoolable cable for running a well tool in and out of a wellbore and particularly running tools in highly deviated wellbores, the cable comprising:
    a plurality of parallel and slidable elongate composite rods arranged in a bundle wherein the rods may slide relatively to each other and wherein each of said rods is formed of generally axially oriented high strength fibers fixed in a binder;
    an outer flexible protective sheath for covering said plurality of rods and holding said rods together in said bundle; and
    energy conductor means arranged within said outer protective sheath.

7. The composite cable according to claim 6 wherein said energy conductor means includes at least one electrical conductive path formed by a layer of thin wire lain in a criss-cross pattern about the rods arranged in a bundle.

8. The composite cable according to claim 6 wherein said energy conductor means includes at least one conductive path formed by an electrical or optical cable member which is imbedded within the rods arranged in a bundle.

9. In a well system having a wellbore extending into an earth formation wherein the wellbore has at least one deviated portion relative to the remainder of the wellbore, a well tool inserted into said wellbore, and a composite cable connected to said well tool for inserting and removing the same, wherein the composite cable comprises:
- a plurality of parallel and slidable elongate composite rods arranged in a bundle wherein the rods may slide relatively to each other and wherein each of said rods is formed of generally axially oriented high strength fibers fixed in a binder;
- an outer flexible protective sheath for covering said plurality of rods and holding said rods together in said bundle; and
- electrical conductor means arranged within said outer protective sheath.

* * * * *